Patented May 18, 1954

2,678,934

UNITED STATES PATENT OFFICE 2,678,934

METHOD OF MAKING GLYCERIDE-FUMARIC ACID REACTION PRODUCTS

Oliver J. Grummitt, Cleveland, Ohio, assignor to The Sherwin-Williams Company, Cleveland, Ohio, a corporation of Ohio No Drawing. Application August 9, 1951,
Serial No. 241,169

15 Claims. (Cl. 260—404.8)

This invention relates as indicated to an improved method for effecting the reaction between fumaric acid and certain non-conjugated, unsaturated fats, and more particularly, to the catalyzed process of effecting such a reaction or condensation.

Both maleic anhydride and fumaric acid are important components in coating compositions. Their utility depends upon their bi-functional acid character which permits reactions of esterification and polyesterification leading to high molecular weight products. Usually, the maleic anhydride and fumaric acid are combined with some other organic material prior to esterification. Organic compounds capable of reacting with such acidic materials include drying and semi-drying oils such as soya, linseed, safflower, and tung, naturally occurring acids such as rosin, and naturally occurring unsaturated hydrocarbons, such as those found in turpentine. The products of these reactions are dibasic acids or, in some instances, tribasic acids as in the case of rosin. By esterification with polyhydric alcohols, such as glycerol, pentaerythritol, and the like, resinous polyesters are obtained.

The mode of combination between maleic anhydride and fumaric acid with the various organic materials mentioned above may be one of two fundamental types. One of these is the conventional Diels-Alder reaction which is typified by the following equation:

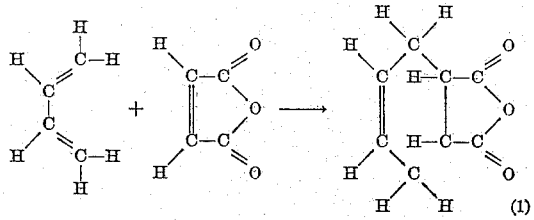

Using fumaric acid as the reactant material, the equation is as follows:

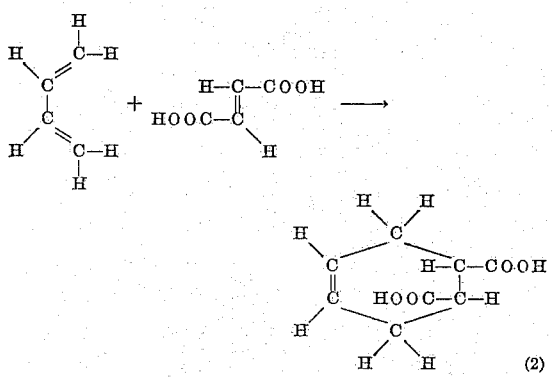

These products differ in two respects. The maleic anhydride adduct is, of course, an anhydride, and it has the "cis" configuration. The fumaric acid product, on the other hand, is the dibasic acid, and it has the "trans" configuration.

Reactions of the type illustrated in Equations 1 and 2 above would occur at moderate temperatures of about 100° C. with conjugated oils such as tung and dehydrated castor oil, and with hydrocarbons containing conjugated double bonds, such as cyclopentadiene, butadiene, and with naturally occurring acids having conjugated double bonds such as are found in rosin to some extent.

The second possible reaction of maleic anhydride and fumaric acid with various other organic compounds is less clear with respect to the structure of the addition compound. These reactions occur generally at higher temperatures, e. g., 200–300° C., which are, with respect to the usual Diels-Alder conditions, sometimes referred to as "forcing conditions." These reactions can occur with non-conjugated oils, drying and semi-drying oils, such as linseed and soya, and with non-conjugated hydrocarbons, such as, alpha- and beta-pinene which are constituents of turpentine. In the case of maleic anhydride, such reactions with non-conjugated drying oils are covered in a series of patents issued to E. T. Clocker, Pat. Nos. 2,188,882–90, dated January 30, 1940. There are several papers in the literature which discuss the possible structure of the adducts from non-conjugated reactants. The prevalent opinion is that addition occurs at the double bond of maleic anhydride or fumaric acid by means of a hydrogen atom from an active methylene group of the other reactant. This is shown in the following equation where the methylene group might be one in the alpha position to a double bond as in oleic, linoleic, or linolenic acid of one of the drying oils; e. g., with oleic acid,

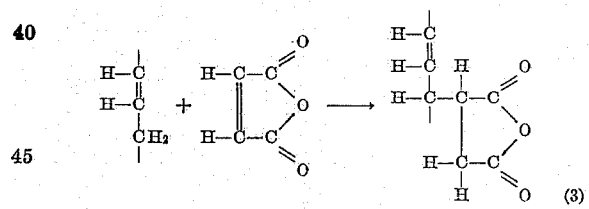

This product is an aliphatic succinic anhydride; with fumaric acid substituted for maleic anhydride, a similar product but in the acid "trans" form would be obtained. There is fairly good evidence for this structure in the case of maleic anhydride but there is relatively little evidence in the case of fumaric acid.

The relative value as coating materials of the various possible maleic anhydride adducts and fumaric acid adducts has not been determined in closely controlled experiments. In one notable instance, the rosin-maleic anhydride product and the rosin-fumaric acid product have been compared, and it was found that the latter material is the preferred one in varnish formulation. The films obtained from it have generally superior properties.

The preparation of these adducts is relatively simple since it usually involves nothing more than heating the reactants, with or without an inert atmosphere, and possibly with a reflux apparatus so as to prevent loss of the anhydride or acid.

The present invention is concerned with the great difference in ease of the reaction between maleic anhydride and fumaric acid with a drying oil, such as linseed oil. It has been found that the relatively slow reaction between fumaric acid and the various non-conjugated drying and semi-drying oils can be catalyzed with the resultant economic advantages of savings in time of reaction and in heat consumed. In certain instances the fumaric acid product is preferred for various coating compositions, and accordingly such acceleration in its preparation becomes doubly valuable.

It should be pointed out that in the case of the normal Diels-Alder reaction there is a general belief that there is no catalyst for this reaction. Although there are instances in the literature which claim such agents, there has been no substantiation thereof. There is also considerable literature available on the catalyzed isomerization of maleic to fumaric and fumaric to maleic derivatives. Among the common catalysts for this purpose are the halogens, such as, iodine.

It is a principal object of this invention, therefore, to provide a method for catalyzing the reaction between fumaric acid and a drying oil, which reaction has been found under ordinary circumstances to proceed at a very much slower rate than the corresponding reaction between maleic anhydride and a drying oil. An acceleration of this slow rate is a desirable advantage in the conservation of heat, time, and a reduced loss of fumaric acid due to volatilization. This would make the use of fumaric acid in the preparation of coating compositions more economical and more attractive.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

Broadly stated, this invention comprises a process for effecting the condensation of a member of the class consisting of fumaric acid, fumaric acid anhydride, esters of fumaric acid, half esters of fumaric acid, salts of fumaric acid, salt-esters of fumaric acid and amides of fumaric acid with an aliphatic, non-conjugated, poly-unsaturated organic compound which comprises admixing a member of said class with an aliphatic, non-conjugated, poly-unsaturated organic compound, introducing from 0.1% to about 2% by weight of the mixture of a free halogen, and heating the reaction mass to a temperature within the range of from about 175° C. up to 300° C. until said class member has reacted.

It is convenient in illustrating this invention to compare corresponding products made from maleic anhydride with those made from fumaric acid. Among the variables which have been studied in this connection were the concentration of maleic anhydride with respect to the oil, temperature, rate of consumption of maleic anhydride, the acid and saponification numbers of the product, etc. The four concentrations of maleic anhydride with respect to the oil which were studied were 4.8%, 12%, 23.1% and 33%. A convenient reaction temperature is 200° C. In preparing a product containing 5% of maleic anhydride, it was found that 80% of the anhydride had reacted in 30 minutes and 92% in 1 hour. After 1 hour, the remaining 8% of maleic anhydride is very slowly reacted. The determination of unreacted maleic anhydride depended upon an extraction of the product with hot water and titration of that aqueous extract. Model experiments showed that this quantitatively measured uncombined maleic anhydride.

The acid number of these maleic anhydride-oil adducts is of particular interest. In the conventional acid number determination using benzene-alcohol as a solvent and titrating with an alcoholic base, the observed value was generally about 50% of the calculated value. It was found in other work that this was due to a rapid reaction between the adduct and the alcohol to form the half ester, thereby permitting the titration of but a single carboxyl group.

The ultra-violet absorption of the 5% product at 2325 Å. indicated about 2.7% of a 2-double bond conjugation. Whether this absorption is actually due to conjugation or to some other factor is not known.

When the 5% product is heated for several hours at 200° C. or higher, carbon dioxide is slowly evolved. In one experiment, such a product was heated for 6 hours at 200° C., 4 hours at 225° C., 3 hours at 250° C., 3 hours at 275° C. and 3 hours at 300° C. The total amount of carbon dioxide evolved was determined quantitatively by absorption in alkali. This corresponded to about 14% of the maleic anhydride present, assuming that one molecule of carbon dioxide came from one molecule of combined maleic anhydride. The acid number decreased about 6%, but was still roughly equivalent to ½ the original calculated value. The product became quite viscous due to heat bodying and the refractive index increased.

The above preparation and properties of the adduct were then compared with the corresponding reaction between fumaric acid (5%) and linseed oil. When these were reacted at 200° C., the insoluble acid is apparent even after 2 hours. With gradually increasing temperatures, it is not until 250° C. that the rate of combination, as indicated by the disappearance of the solid acids, becomes appreciable. In a second experiment carried out at 250° C., approximately 95% of the fumaric acid had reacted within a period of 1 hour. In the case of maleic anhydride at 200° C., the consumption of anhydride in 1 hour was about the same, 92%. The approximate difference then in rate of reaction between maleic and fumaric acid with a drying oil is so great that in order to bring the rates to approximate equality, the temperature in the case of fumaric acid must be at least 50° C. higher.

There are several properties of the fumaric acid product which indicate that it is different from the corresponding maleic anhydride product. With respect to the acid number, the observed value in the case of maleic anhydride is about 50% of the calculated. In the case of fumaric acid, the observed value generally runs about 75% of the calculated value. Second, the ultra-violet absorption of the fumaric product at 2325 Å. indicates 9.1% of 2-double bond conjugation as compared to 2.7% for the maleic product. Whether this absorption is due to configuration or to some other factor is not known. The difference in absorption does show, however, a structural and/or configurational difference between the products. At high concentrations, e. g., 33%, the fumaric acid product gels very rapidly while the 33% maleic anhydride product is fluid at elevated temperatures and solid at room temperature. Both adducts evolve carbon dioxide when heated in the region of 250–300° C. In the case of the maleic product, the decrease in acid number is relatively small, e. g., about 5%. However, in the case of the fumaric product, the decrease is much larger, that is, about 15%. The value in the latter case, however, is still higher than 50% of the calculated value. In view of these differences in properties, it appears quite unlikely that the reaction with fumaric acid involves a dehydration and isomerization to maleic anhydride which then combines with the oil. According to the literature, fumaric acid is slowly converted to maleic anhydride at temperatures in the neighborhood of 200° C. This cannot be an important reaction in the case of these additions to linseed oil or other such drying oils, or the properties of the resulting products would be more nearly identical. The decrease in acid number of the fumaric acid product when heated at 250–300° C. might be due to anhydride formation but whether that is an anhydride of the same structure and configuration as the maleic anhydride product is not known.

In studying these reactions, it was felt that it would be desirable to employ a catalyst for the conversion of fumaric acid to maleic anhydride, thereafter effecting condensation between the maleic anhydride thus formed and a drying oil. Since the prior art had indicated that various halogens were satisfactory for this purpose, iodine was selected as a convenient halogen, although chlorine, bromine and fluorine might also be used for this purpose. Quite unexpectedly, however, it was found that the halogen, instead of catalyzing the isomerization of fumaric acid to maleic acid, catalyzed the condensation of fumaric acid with the drying oil.

Comparative experiments with alkali refined linseed oil and fumaric acid, 6% by weight with respect to the oil, were run simultaneously to 200–205° C., in the conventional 3-necked flask fitted with mechanical stirrer, thermometer, condenser, etc. To one mixture there was added 0.5% iodine by weight. At the end of 6 hours' heating, the mixture containing no catalyst was still heterogeneous, showing that the reaction was not complete. The mixture containing catalyst had reacted completely in 15 min. as indicated by its homogeneity. Analysis of this latter product by extraction with hot water showed less than 0.2% of uncombined fumaric acid. The acid number of the catalyzed product was 54 compared to a calculated value of 58. If this had been a maleic anhydride product of the same concentration, the observed acid number would be about 27. Thus the product made by the catalyzed reaction is not a maleic anhydride product which would be expected to result if the catalyst served in its known function of isomerizing fumaric acid to maleic acid.

In general, from 0.1% to about 2% by weight of the mixture of the halogen catalyst is all that is required to catalyze the reaction. Temperatures in the catalyzed process may range from about 175° C. up to 230° C. At more elevated temperatures, the rate of reaction is considerably faster and although it will be catalyzed by the presence of the halogen, the use of a catalyst above about 230° C. is not so advantageous. The catalyzed reaction mass, while effective at about 200 to 210° C., may, nevertheless be run at higher temperatures, e. g., up to 300° C. Iodine, for example, may be introduced in situ by the thermal decomposition at 100°–300° C. of suitable inorganic or organic iodo compounds. Specific examples of such materials include hydrogen iodide, ammonium iodide, the hydrogen iodide salt of various amines, methyl iodide, iodo benzene, and poly-iodinated compounds such as iodoform. Other halogens in decomposable chemical combination may likewise be introduced in desired quantities by thermal decomposition at elevated temperatures. A calculated amount of the halogen compound is added to the reaction mass and the temperature raised to the decomposition temperature, i. e., from 100°–300° C. whereby active free halogen catalyst is released.

The amount of fumaric acid with respect to the oil may vary widely, depending upon the desired product. Accordingly, for most purposes, the end product will contain from 0.5% to 30% by weight of the acid. It will be understood, however, that the quantity of acid is not critical insofar as this invention is concerned. Derivatives of fumaric acid such as esters, half-esters, salts, salt-esters, and imides, may also be used under these "forcing conditions," but their reaction rate will tend to be somewhat slower than with the acid, or anhydride. Specific examples include methyl fumaric acid, dimethyl fumarate, sodium methyl fumarate, calcium fumarate, fumaric amide, etc.

In place of linseed oil, this catalyzed reaction with fumaric acid has been found to be applicable to other drying and semi-drying oils including cottonseed oil, soya bean oil, safflower oil, dehydrated castor oil (which is partly conjugated and partly non-conjugated) etc. As indicated above, other halogens may be employed in these reactions, but they are obviously less convenient because of the greater volatility of fluorine, chlorine and bromine. In addition to the drying and semi-drying oils, the catalytic effect of the halogens in accelerating the condensation of fumaric acid has been found to be applicable to other unsaturated materials including rosin, turpentine, and the like. It is not desired to include, however, the catalysis of any of these reactants with systems containing solely conjugated double bonds.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A process for effecting the condensation of a member of the class consisting of fumaric acid, fumaric acid anhydride, esters of fumaric acid, half esters of fumaric acid, salts of fumaric acid, salt esters of fumaric acid and amides of fumaric acid with an aliphatic, non-conjugated, polyunsaturated fatty oil which comprises admixing a member of said class with an aliphatic, non-conjugated, poly-unsaturated fatty oil, introducing from 0.1% to about 2% by weight of the mixture of a free halogen, and heating the reaction mass to a temperature within the range of from about 175° C. up to 300° C. until said class member has reacted.

2. A process for effecting the condensation of fumaric acid with an aliphatic, non-conjugated, poly-unsaturated organic compound which comprises admixing fumaric acid with an aliphatic non-conjugated poly-unsaturated fatty oil, introducing from 0.1% to about 2% by weight of the mixture of a free halogen, and heating to a temperature within the range of from about 175° C. up to 300° C. until the fumaric acid has reacted.

3. A process in accordance with claim 1 in which the aliphatic non-conjugated poly-unsaturated fatty oil is selected from the group consisting of drying oils and semi-drying oils.

4. A process in accordance with claim 1 in which the aliphatic non-conjugated poly-unsaturated fatty oil is a non-conjugated drying oil.

5. A process in accordance with claim 1 in which the aliphatic non-conjugated poly-unsaturated fatty oil is a non-conjugated semi-drying oil.

6. A process in accordance with claim 1 in which the aliphatic non-conjugated poly-unsaturated fatty oil is a non-conjugated vegetable drying oil.

7. A process in accordance with claim 1 in which the aliphatic non-conjugated poly-unsaturated fatty oil is a linseed oil.

8. A process in accordance with claim 1 in which the aliphatic non-conjugated poly-unsaturated fatty oil is alkali refined linseed oil.

9. A process in accordance with claim 1 in which the aliphatic non-conjugated poly-unsaturated fatty oil is soyabean oil.

10. A process in accordance with claim 1 in which the aliphatic non-conjugated poly-unsaturated fatty oil is safflower oil.

11. A process in accordance with claim 1 in which the halogen is iodine.

12. A process in accordance with claim 1 in which the aliphatic non-conjugated poly-unsaturated fatty oil is alkali refined linseed oil and the halogen is iodine.

13. A process in accordance with claim 1 in which the amount of fumaric acid based on the weight of the oil is such that the end product contains from about 0.5% to 30% by weight of the acid.

14. A process for effecting the condensation of fumaric acid with alkali refined linseed oil which comprises admixing from about .5% to about 30% of fumaric acid with from about 99.5% to about 70% by weight of alkali refined linseed oil, adding to said mixture from 0.1% to about 2% by weight of said mixture of iodine and heating to a temperature of from 200 to 205° C. until the fumaric acid has reacted.

15. A process in accordance with claim 14 in which the amount of fumaric acid is 6% by weight of the alkali refined linseed oil.

References Cited in the file of this patent

UNITED STATES PATENTS

| Number | Name | Date |
|---|---|---|
| 2,257,384 | Johnston | Sept. 30, 1941 |
| 2,306,281 | Rust | Dec. 22, 1942 |